United States Patent [19]
Van Doorn et al.

[11] 3,938,131
[45] Feb. 10, 1976

[54] ENERGIZING CIRCUIT FOR A VISUAL DISPLAY ELEMENT

[75] Inventors: Rudolf Alexander Van Doorn; Pieter Tammo Bolwijn, both of Eindhoven, Netherlands

[73] Assignee: U.S. Philips Corporation, New York, N.Y.

[22] Filed: Oct. 3, 1974

[21] Appl. No.: 511,662

[30] Foreign Application Priority Data
Oct. 11, 1973 Netherlands .................... 7313982

[52] U.S. Cl. ...... 340/324 R; 340/366 B; 350/160 R
[51] Int. Cl.² ........................................ G08B 5/36
[58] Field of Search ............ 340/324 R, 336, 366 B, 340/378 R; 350/160 R

[56] References Cited
UNITED STATES PATENTS

| | | | |
|---|---|---|---|
| 3,245,313 | 4/1966 | Zaromb | 350/160 R |
| 3,451,741 | 6/1969 | Manos | 350/160 R |
| 3,652,149 | 3/1972 | Rogers | 350/160 R |
| 3,745,044 | 7/1973 | Letter | 350/160 R |
| 3,854,794 | 12/1974 | Van Dam et al. | 350/160 R |

*Primary Examiner*—David L. Trafton
*Attorney, Agent, or Firm*—Frank R. Trifari; Daniel R. McGlynn

[57] ABSTRACT

An energizing circuit for a redox display device in which a criterion for terminating the registering or erasing action is provided for the energizing electrodes.

5 Claims, 1 Drawing Figure

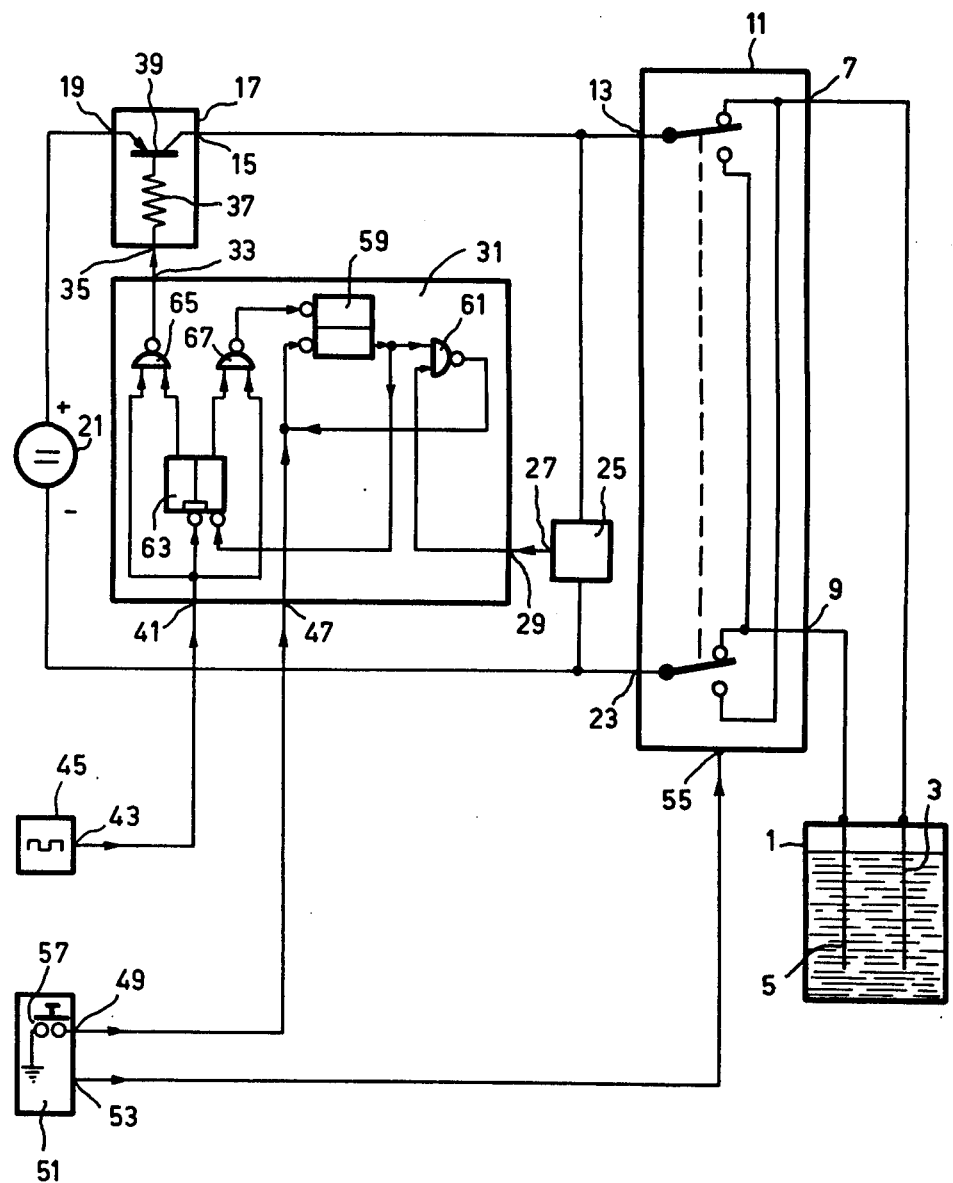

ENERGIZING CIRCUIT FOR A VISUAL DISPLAY ELEMENT

The invention relates to an energizing circuit for a visual display element comprising a liquid present between inert energizing electrodes with a redox pair with one of its components being insoluble, a supply source which is coupled to the energizing electrodes of the display element in such a manner that it can be switched off, and a measuring circuit by means of which the energisation of the display element by the supply source can be dosaged.

Such an energizing circuit is known in the art in which the potential of the liquid relative to one of the energizing electrodes is measured on a reference electrode and serves as a measure of terminating the energisation.

This circuit has the drawback that no criterion can be found for terminating a registering action with the aid of a reference electrode.

It is an object of the invention to provide a circuit obviating this drawback.

To this end an energizing circuit of the kind described in the preamble according to the invention is characterized in that the sizes of the contact surfaces of the energizing electrodes with the liquid are substantially equal, while a polarity change-over switch is connected between the supply source and the display element for changing over between a registering and an erasing state, while the measuring circuit is a threshold circuit coupled to the change-over switch on the side of the supply source, an output of said threshold circuit being coupled to a switching signal input of a switch so that the supply source can be switched off with the aid of the threshold circuit both in the registering and the erasing state after reaching the same threshold value of the voltage between the energizing electrodes of the display element.

The invention is based on the recognition of the fact that both for registering and for erasing it is not necessary to use separate reference electrodes for measuring the condition of one of the energizing electrodes when the surfaces of the electrodes are chosen to be substantially equal.

In case of not too large current intensities supplied by the supply source it is possible to simultaneously energize and measure while in case of large current intensities preferably alternately a current is passed through the display element and the voltage across the display element is measured by the threshold circuit.

The invention will now be described with reference to the drawing.

The drawing which comprises a sole FIGURE illustrates by way of a block-schematic diagram an energizing circuit according to the invention.

In the drawing a visual display element 1 has two energizing electrodes 3, 5 which are inert and are in contact over at least part of their surface with a liquid comprising a redox pair with one of its components being insoluble. The contact surfaces between the energizing electrodes and the liquid are substantially equal. One of the energizing electrodes can be seen through a transparent part of the wall of the display element 1. The electrodes 3 and 5 are connected to outputs 7 and 9 of a change-over switch 11 an input 13 of which is connected to an output 15 of a switch 17 which has an input 19 connected to the positive terminal of a supply source 21. A further input 23 of the change-over switch 11 is connected to the negative terminal of the supply source 21.

A threshold circuit 25 is connected between the inputs 13 and 23 of the change-over switch 11. This threshold circuit has an output 27 at which a signal is produced when the voltage between the inputs 13 and 23 exceeds a threshold value. The output 27 is connected to an input 29 of a logical circuit 31 an output 33 of which is connected to an operating signal input 35 of the switch 17. The operating signal input 35 of the switch 17 is connected through a resistor 37 to the base of a transistor 39 which provides for switching on and off a circuit of supply source 21 and display element 1 and limits the current in this circuit as a result of the resistor 37.

Furthermore the logical circuit 31 has an input to which an output 43 of a pulse generator 45 is connected and an input 47 which is connected to an output 49 of an operating device 51, which operating device 51 has an output 53 connected to an input 55 of the change-over switch 11 to set this change-over switch in the position of registering or erasing. The positions of registering and erasing of the change-over switch 11 determine the direction in which the current is passed through the display element 1 in case of a possible energisation, while the period of time of the passage of current through the display element 1 is determined by the logical circuit 31 in co-operation with the operating device 51 and the threshold circuit 25.

When a push-button 57 of the operating device 51 is depressed, a set signal going from positive to zero is applied to a set-reset flipflop 59 of the logical circuit so that this flipflop assumes its set state. The flipflop 59 maintains the set state as a result of a feedback through a NAND-gate 61 as long as the threshold circuit 25 does not block the gate 61. The out-put of the flipflop 59 is also connected to an input of a JK flipflop 63 which ensures that as long as the gate 61 is not blocked every other pulse of the signal applied to a further input of the JK flipflop 63 and originating from the output 43 of the pulse generator 45 is alternately applied through two NAND-gates 65, 67 to the operating signal input 35 of the switch 17 and to a reset input of the flipflop 59.

The transistor 39 of the switch 17 thus conveys pulsewise a current to the display element 1 while in the intervals between the current pulses the threshold circuit 25 applies a signal to its output 27 which after exceeding the threshold voltage between the energizing electrodes 3, 5 of the display element 1 blocks the gate 61 so that the flipflop 59 is reset in case of a subsequent pulse provided by the gate 67 and thereby stops the JK flipflop 63 so that no current can be applied any longer to the display element 1.

The time between the successive pulses of the pulse generator 45 is utilized by the circuit to obtain an interval every time after an energizing period so that a measuring period does not immediately follow a preceding energizing period. This has been found to be desirable because only some time after an energizing period the voltage to be measured assumes a value which is characteristic of the state of the energizing electrodes. It will be evident that an interval is not necessary between a measuring period and a subsequent energizing period.

As a result of the above-described composition the display element 1 is found to have substantially the same electrical properties both in the registering and the erasing state on the understanding that the polarity of the voltage between the electrodes 3 and 5 is opposite in both cases. The threshold circuit 25 may thus detect the registered as well as the erased state.

When the supply source 21 supplies a low current through the switch 17, the current need not be interrupted, if desired, to check the voltage across the display element 1 with the threshold circuit 25.

What is claimed is:

1. An energizing circuit for a visual display element having energizing electrodes, comprising a liquid situated between said energizing electrodes, said liquid comprising a redox pair with one component being insoluble, a power supply source coupled to said energizing electrodes capable of being disconnected; a threshold circuit having an output for controlling the power supplied to the display element by said supply source; and a first polarity change-over switch coupled between said supply source and the display element for changing over between a registering state and an erasing state.

2. A circuit as defined in claim 1, wherein said threshold circuit is coupled between the inputs of said polarity change-over switch and responsive to a voltage between said inputs exceeding a predetermined threshold value.

3. A circuit as defined in claim 1, wherein said output of said threshold circuit is operative for disconnecting said supply source.

4. A circuit as defined in claim 1, further comprising a second switch coupled to said output of said threshold circuit for disconnecting said supply source.

5. An energizing circuit as claimed in claim 1, further comprising a logical circuit, wherein said output of said threshold circuit is coupled to the switch-off signal input of said second switch through said logical circuit; and further comprising a pulse generator coupled to said logical circuit for alternately conveying and measuring a voltage across the display element during a predetermined energizing period.

* * * * *